P. EVANS.
AXLE CONSTRUCTION.
APPLICATION FILED FEB. 28, 1914.
1,228,307.
Patented May 29, 1917.
2 SHEETS—SHEET 2.
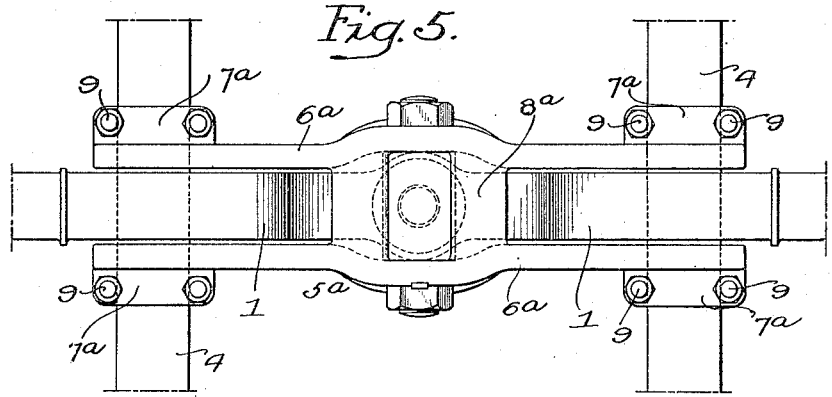
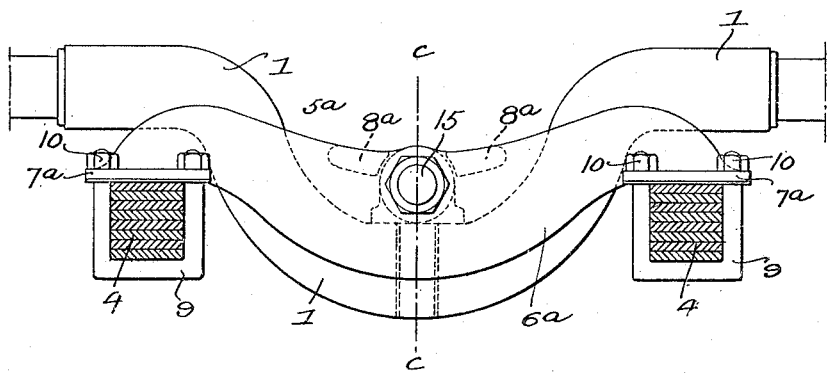
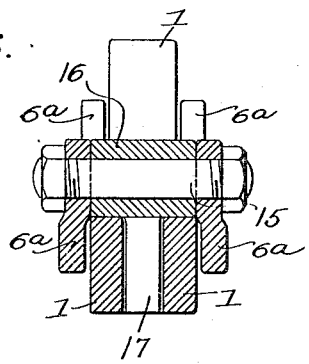
Witnesses—
Charles H. York.
William T. Nash
Inventor
Powell Evans.
by his Attorneys
Howson & Howson

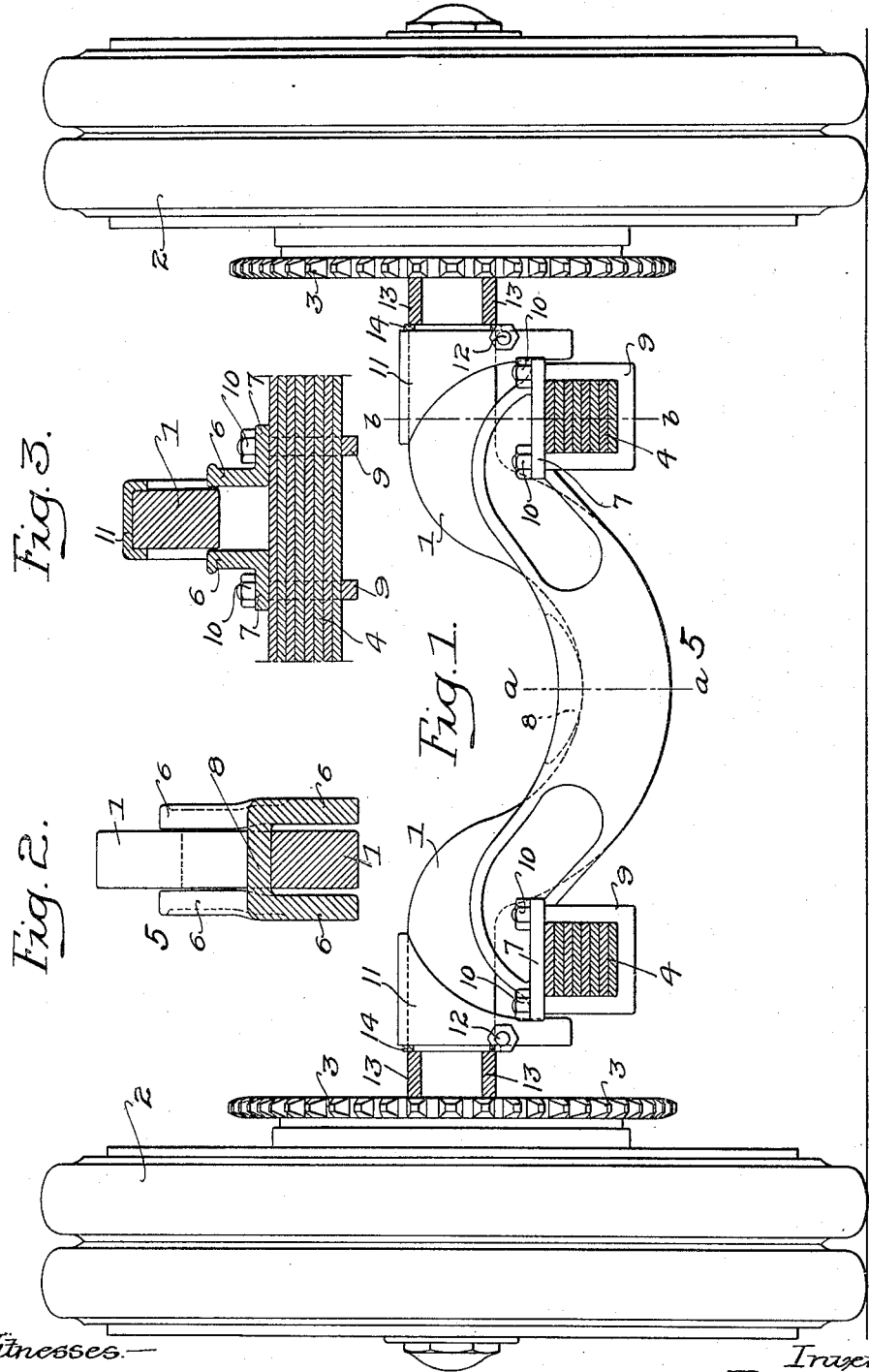

UNITED STATES PATENT OFFICE.

POWELL EVANS, OF PHILADELPHIA, PENNSYLVANIA.

AXLE CONSTRUCTION.

1,228,307. Specification of Letters Patent. Patented May 29, 1917.

Application filed February 28, 1914. Serial No. 821,664.

*To all whom it may concern:*

Be it known that I, POWELL EVANS, a citizen of the United States, residing in Philadelphia, Pennsylvania, have invented certain Improvements in Axle Construction, of which the following is a specification.

One object of my invention is to provide a form of axle particularly adapted for use in connection with motor trucks, which shall include a universal joint mechanism designed to permit of a predetermined amount of movement of the axle before the springs are compressed or otherwise brought into action, the invention particularly contemplating an arrangement of parts which shall primarily be simple, substantial and efficient, as well as reliable under operating conditions.

A further object of the invention is to provide a novel combination of primary and secondary axles interposed between the wheels of a vehicle and the vehicle body and frame.

These objects and other advantageous ends I secure as hereinafter set forth, reference being had to the accompanying drawings, in which:—

Figure 1 is a side elevation, partly in section, illustrating an axle constructed according to my invention and showing its position relatively to the associated parts;

Figs. 2 and 3 are vertical sections taken respectively on the lines *a—a* and *b—b*, Fig. 1;

Fig. 4 is a side elevation, partly in section, illustrating a modified form of my invention;

Fig. 5 is a plan of the apparatus shown in Fig. 4, and

Fig. 6 is a vertical section on the line *c—c*, Fig. 4.

In Figs. 1 to 3 of the above drawings, 1 represents the axle proper, which consists of a steel forging having comparatively straight end portions and a downwardly bowed middle portion of substantially rectangular section. In the drawings I have shown double tire wheels 2 as mounted on the axle, and have illustrated them as each provided with a driving sprocket 3. The springs on which the body or any other desired portion of the truck or vehicle is supported, are indicated at 4, and while I have shown them as laminated, it is obvious that they may be made in any suitable form, without departing from my invention.

For operatively connecting these springs to the axle, I provide a steel saddle casting 5 in the form of two substantially parallel downwardly bowed side plates 6 united by a longitudinally extending plate 8 and each terminating in relatively flat plates 7, designed to rest upon the top surface of one of the springs 4. The cross plate 8 has a convexly curved lower surface designed to engage and have a limited rolling movement upon the concavely curved top surface of the middle part of the axle 1. In the present instance I have shown this cross plate 8 as integral with the side plates 6, and so formed that its under surface is curved on a shorter radius than the top surface of the axle.

The two springs 4 are hung from the plates 7 by U-shaped clamps 9, which extend around them and have threaded ends passing through said plates for the reception of nuts 10. Any end thrust of the saddle is taken by a pair of U-shaped thrust plates 11, which are mounted in an inverted position upon the axle 1 slightly over or to one side of the springs 4 and so placed that their free ends extend respectively adjacent the ends of the spring-engaging plates 7 of the side members 6.

For holding these thrust-receiving members rigidly to the axle, I connect the parallel arms of each of them by a bolt 12 which firmly clamps them in any desired position upon the axle. Between each of these thrust-receiving members and the sprocket 3 I mount upon the axle a collar 13 for the attachment of one of the radius rods, in the present instance also placing a bearing ring or washer between each collar and the adjacent thrust-receiving member 11.

Under conditions of operation, it will be understood that the springs 4 and consequently the part of the truck carried by them, has a limited universal movement relatively to the wheels 2, for obviously the axle is free to rotate to a greater or less extent relatively to the wheels, and the curved plate 8 of the saddle is likewise free to roll laterally to a limited extent on the axle, as well as to move sidewise. Moreover, it will be noted that this substantially universal movement occurs before either of the springs is brought into action, since obviously one end of the axle would have to be lowered or drop until its under surface engaged the top surface of a spring 4 before the latter could be compressed.

In that form of my invention illustrated in Figs. 4 to 6 inclusive, I have shown a saddle member which, while including side plates 6ª and two connecting plates or members 8ª, does not bear directly upon the axle but is connected thereto by a horizontal bolt 15 extending between the upper part of the side plates 6ª at a point midway between the springs 4 together with a sleeve 16, journaled on said bolt and provided with a pin 17 extending into a vertical hole in the center of the axle 1. As before, the saddle 5ª is provided with spring-engaging plates 7ª connected to the springs 4 by clamping shackles 9.

While in the form of my invention shown in Figs. 1 to 3 inclusive the saddle or secondary axle 5 has a limited movement laterally or pivotally upon the primary axle 1 by reason of its loose fit and line contact, as shown in Fig. 2, in that form of the invention shown in Figs. 4 to 6 inclusive the pintle 17 of the sleeve 16 forms a true pivotal connection for permitting a generally horizontal movement between the primary and secondary axles limited by the clearance between the side member 6ª and the secondary axle, and while in Figs. 1 to 3 a true rolling action is possible between the primary and secondary axles, in the other form of my invention the movement is a pivotal one. In any case, however, the construction is such that there is practically a universal movement possible between the secondary axle and the wheels, and the parts are so designed that the springs are not compressed until the primary axle has so far turned on its pivot 15 or on the rolling plate 8 as to permit one side or the other to actually strike the top surface of the spring 4.

I claim:—

1. The combination of an axle; a member elongated in the general line of said axle to constitute a saddle and formed to have a limited universal connection with the axle; and a structure to be supported including members extending under the axle in engagement with the ends of the saddle.

2. The combination of an axle; structures to be supported; with a saddle elongated in the general line of the axle supporting said structures adjacent its ends and having a portion movably engaging and curved to roll upon said axle.

3. The combination of an axle; a structure including springs to be supported; and a laterally elongated member constituting a saddle having its ends respectively connected to the springs and including a portion curved to move upon the axle.

4. The combination of an axle with an elongated bar extending in the general line thereof, said bar including a curved portion in rolling engagement with the axle and having forked ends extending on opposite sides of the latter.

5. The combination of an axle having a concave upper face and a laterally elongated bar constituting a saddle structure extending substantially in the line of the axle and provided with a convex face free to rock upon said concave face of the axle.

6. The combination of an axle; a saddle including side plates adjacent the opposite sides of the axle; and a cross member having a limited universal connection with said axle.

7. The combination of an axle; a saddle extending substantially parallel with said axle and movably engaging the same; with thrust members carried by the axle and extending in positions to be engaged by the ends of the saddle.

8. The combination of an axle having a portion of its top surface curved; with an elongated bar constituting a saddle having a curved portion adjacent its middle engaging the curved part of the axle so as to be capable of rolling thereon.

9. The combination of an axle having a downwardly bowed central portion; with a saddle consisting of an elongated member extending in the general line of the axle and including a convex portion movably engaging said downwardly curved portion of the axle.

10. The combination of an axle having its central portion downwardly bowed; with a saddle consisting of members on opposite sides of the axle and a transverse portion connecting said members, said connecting portion having its lower face convexly curved to roll upon the top surface of the bowed portion of the axle.

11. The combination of springs; a saddle having plates at its opposite ends; means for supporting the springs from said plates; and an axle having a portion movably engaged by the saddle, the latter being curved to have a limited rolling motion upon said axle.

12. The combination of an axle; a saddle consisting of a cross member and two side members, the latter extending on opposite sides of the axle and the cross member being curved to roll on said axle; a plate at each end of each of the side members of the saddle; springs; means for connecting said springs to the saddle plates; with U-shaped thrust members fixed to the axle and each extending into position to be engaged by two adjacent ends of the saddle side members.

13. In a road vehicle having a body the combination of road-engaging wheels; a primary axle supported by the wheels; and a load supporting secondary axle extended in the general line of the primary axle and connected adjacent its ends to the vehicle body, said secondary axle having a limited universal motion connection with said primary axle.

14. In a road vehicle the combination of road-engaging wheels; a primary axle supported by the wheels; and a load-supporting secondary axle having a limited universal motion connection with said primary axle; with thrust members on the primary axle placed to limit the longitudinal movement of the secondary axle relatively thereto.

In testimony whereof, I have signed my name to this specification, in the presence of two subscribing witnesses.

POWELL EVANS.

Witnesses:
WILLIAM E. BRADLEY,
WM. A. BARR.